US005573412A

United States Patent [19]

Anthony

[11] Patent Number: 5,573,412

[45] Date of Patent: Nov. 12, 1996

[54] ELECTRICAL CONNECTOR HOUSING

[75] Inventor: John C. Anthony, Fairfield, Conn.

[73] Assignee: Hubbell Incorporated, Orange, Conn.

[21] Appl. No.: 442,896

[22] Filed: May 17, 1995

[51] Int. Cl.$^{6}$ ........................ H02G 3/18

[52] U.S. Cl. ........................ 439/133; 220/242; 439/135; 439/489; 439/491

[58] Field of Search ........................ 439/133, 135, 439/136, 142, 488–491; 220/241, 242; 174/66, 67

[56] References Cited

U.S. PATENT DOCUMENTS

| | | | |
|---|---|---|---|
| 1,662,275 | 3/1928 | Lane | 439/142 |
| 2,844,805 | 7/1958 | Darrell . | |
| 3,790,914 | 2/1974 | Hough . | |
| 4,036,396 | 7/1977 | Kennedy et al. | 174/67 |
| 4,237,342 | 12/1980 | Eller et al. | 439/142 |
| 4,250,349 | 2/1981 | Bennett | 220/242 |
| 4,343,411 | 8/1982 | Chesnut et al. | 220/242 |
| 4,531,798 | 7/1985 | Baur et al. . | |
| 4,653,824 | 3/1987 | Jason et al. . | |
| 4,673,230 | 6/1987 | Baumgart | 439/133 |
| 4,702,539 | 10/1987 | Cusick, III et al. | 439/491 |
| 4,979,634 | 12/1990 | Begley | 220/242 |
| 4,988,832 | 1/1991 | Shotey | 174/67 |
| 5,108,297 | 4/1992 | Hoffman et al. | 439/134 |
| 5,273,445 | 12/1993 | Ehrenfels et al. | 439/134 |

FOREIGN PATENT DOCUMENTS

| | | | |
|---|---|---|---|
| 2840696 | 3/1980 | Germany . | |
| 3317480 | 11/1984 | Germany | 439/133 |

OTHER PUBLICATIONS

Killark Catalog, Electrical Construction Products, 1994, Section 4, pp. 1–16.

*Primary Examiner*—Gary E. Elkins
*Attorney, Agent, or Firm*—Jerry M. Presson; David L. Tarnoff

[57] ABSTRACT

An electrical connector housing having a tubular body portion, a flange portion and a cylindrical shroud surrounding an electrical connector. The shroud has at least one aperture or lockout hole in a side wall thereof to removably receive a locking member. The removable locking member is preferably a padlock having a substantially U-shaped shackle extending through the lockout hole in the Shroud to prevent insertion of a mating electrical connector into the electrical connector housing. The mounting flange portion has a notched section above the lockout hole in the shroud so that the shroud can be substantially recessed within the tubular body portion and the locking member can still be easily installed into the lockout hole.

20 Claims, 10 Drawing Sheets

ELECTRICAL CONNECTOR HOUSING

FIELD OF THE INVENTION

The present invention relates to an electrical connector housing which is mounted in an opening formed in an electrical enclosure and designed to accept a locking member such as a padlock. More specifically, the electrical connector housing has a mounting flange portion for coupling the electrical connector to an electrical enclosure, and a tubular shroud for covering the electrical contacts. The mounting flange has a sculptured outer surface for allowing a padlock to be coupled in an aperture or lockout hole formed in the tubular shroud.

BACKGROUND OF THE INVENTION

Electrical connectors are well known in the electrical wiring industry and can be either a male electrical connector or a female electrical connector. The male and female electrical connectors can take various configurations. For example, the male and female electrical connectors can each be connected to the end of a multi-connector cable. Alternatively, either the male electrical connector or the female electrical connector can be mounted on a wiring enclosure or a piece of equipment. A male electrical connector, which is mounted to an enclosure or a piece of equipment, is called an inlet. A female electrical connector, which is mounted to an enclosure or a piece of equipment is called a receptacle or outlet.

Male electrical connectors include at least two, and typically at least three, prongs or contacts extending from a housing for Joining with a complementary number of contact holes formed in a mating female electrical connector. Shrouded male connectors include a cylindrical shroud extending from the base of the housing and encircling the prongs. The shroud is normally at least as long as the prongs and is often slightly longer than the prongs such that the prongs are slightly recessed in the shroud. The shroud primarily serves to protect the prongs from damage during shipping and handling of the electrical connector.

A mating shrouded female electrical connector or receptacle typically has a cylindrically shaped retainer body which is received within the shroud of the male connector and a shroud with a cylindrical recess encircling the contact retainer body to receive the shroud of the male electrical connector therein.

Electrical connector assemblies of the locking type are well known in the electrical connector industry, and are commonly used to prevent accidental separation between a plug or male electrical connector and a receptacle or female electrical connector. Normally, the female connector of such an electrical connector assembly has two or more arcuate, circularly arranged slots, while the male connector has an equal number of arcuate blades which are dimensioned and arranged for insertion into the slots of the female connector by a simple axial movement, and then, via a rotation of one or both of the electrical connectors, the blades can be moved into a position from which they cannot be separated by simple axial movement. To accomplish this, one or more of the blades usually has an L-shaped configuration in which the laterally extended portion, or flag, of the blade engages a recess or shelf within the slot of the female portion as a result of the rotation.

Examples of various rotatable locking type electrical connectors are disclosed in the following U.S. Pat. Nos.: 2,396,901 to Tiffany; 3,393,395 to Hubbell; 3,784,961 to Gartland; 3,945,702 to Poliak et al; 4,213,667 to Wittes; 5,046,961 to Hoffman; and 5,108,297 to Hoffman et al.

Electrical connectors are subject to inadvertent connection to a power source which can result in undesirable operation of electrical equipment or electrical shock to an operator and the injuries associated therewith. This has caused regulations to be enacted by the Occupational Safety and Health Administration (OSHA) which require safety mechanisms to prevent the inadvertent and unauthorized connection of electrical conductors. These regulations require a locking mechanism such that the electrical connector cannot be inadvertently connected to a power source while an electrical device is being serviced or otherwise in a condition where the power is undesired. The locking mechanisms must provide limited access and require a key or other security device to prevent unauthorized connection.

Efforts have been made in the past to produce a locking electrical connector and particularly locking male electrical connectors to prevent unauthorized connection. Examples of various locking electrical connectors may be found in U.S. Pat. No. 2,844,805 to Darrell; U.S. Pat. No. 3,790,914 to Hough; U.S. Pat. No. 4,241,969 to D'Amato; U.S. Pat. No. 5,046,961 to Hoffman; and U.S. Pat. No. 5,273,445 to Ehrenfels.

The above-noted patents disclose locking mechanisms which are relatively complex and expensive to produce. In addition, some of these locking mechanisms are complicated to manufacture and use and require a large number of moving parts which are subject to failure. Furthermore, some of the previous locking mechanisms have not provided the necessary security to prevent unauthorized use of the connector.

In view of the above, it is apparent that there exists a need for an electrical connector housing adapted to receive a locking mechanism or member for preventing inadvertent and/or unauthorized connection thereto. This invention addresses this need in the art, along with other needs and/or problems which will become apparent to those skilled in the art once given this disclosure.

SUMMARY OF THE INVENTION

The disadvantages and limitations of the lock-out devices for electrical connectors are obviated by the present invention. Accordingly, an object of the invention is to provide an electrical connector housing with a locking mechanism to prevent inadvertent and unauthorized connection to a mating electrical connector.

A further object of the invention is to provide an electrical connector housing that is relatively simple to manufacture and use.

Another object of the invention is to provide an electrical connector housing provided with a shroud having a locking mechanism removably coupled to the shroud via a lockout hole.

Another object of the invention is to provide an electrical connector housing having a relatively few number of parts and which is resistant to mechanical failure such that the electrical connector housing can be easily coupled to a mating electrical connector when the locking mechanism is removed from the electrical connector housing.

The foregoing objects are basically attained by an electrical connector housing for an electrical enclosure, comprising: a tubular body portion having a first open end and a second open end with an inner surface extending therebetween, the tubular body portion being adapted to house a set of electrical contacts and receive a mating electrical connector therein; a flange portion extending outwardly from the tubular body portion at the first open end, the flange portion having an interior surface and an exterior surface with a notched section intersecting with the tubular body portion; and a tubular shroud concentrically coupled within the tubular body portion, the tubular shroud having a first end positioned adjacent the first open end of the tubular body portion and a second end coupled to the tubular body portion, the first end of the tubular shroud having a lockout hole formed therein being sized to receive a locking mechanism therein, the first end of the tubular shroud having the lockout hole adjacent said notched section of the outer surface for receiving a locking mechanism therein.

Other objects, advantages and salient features of the present invention will become apparent to those skilled in the art from the following detailed description, which taken in conjunction with the annexed drawings, discloses a preferred embodiment of the invention.

BRIEF DESCRIPTION OF THE DRAWINGS

Referring now to the drawings which form part of this original disclosure.

DETAILED DESCRIPTION OF THE DRAWINGS

Figure 1:
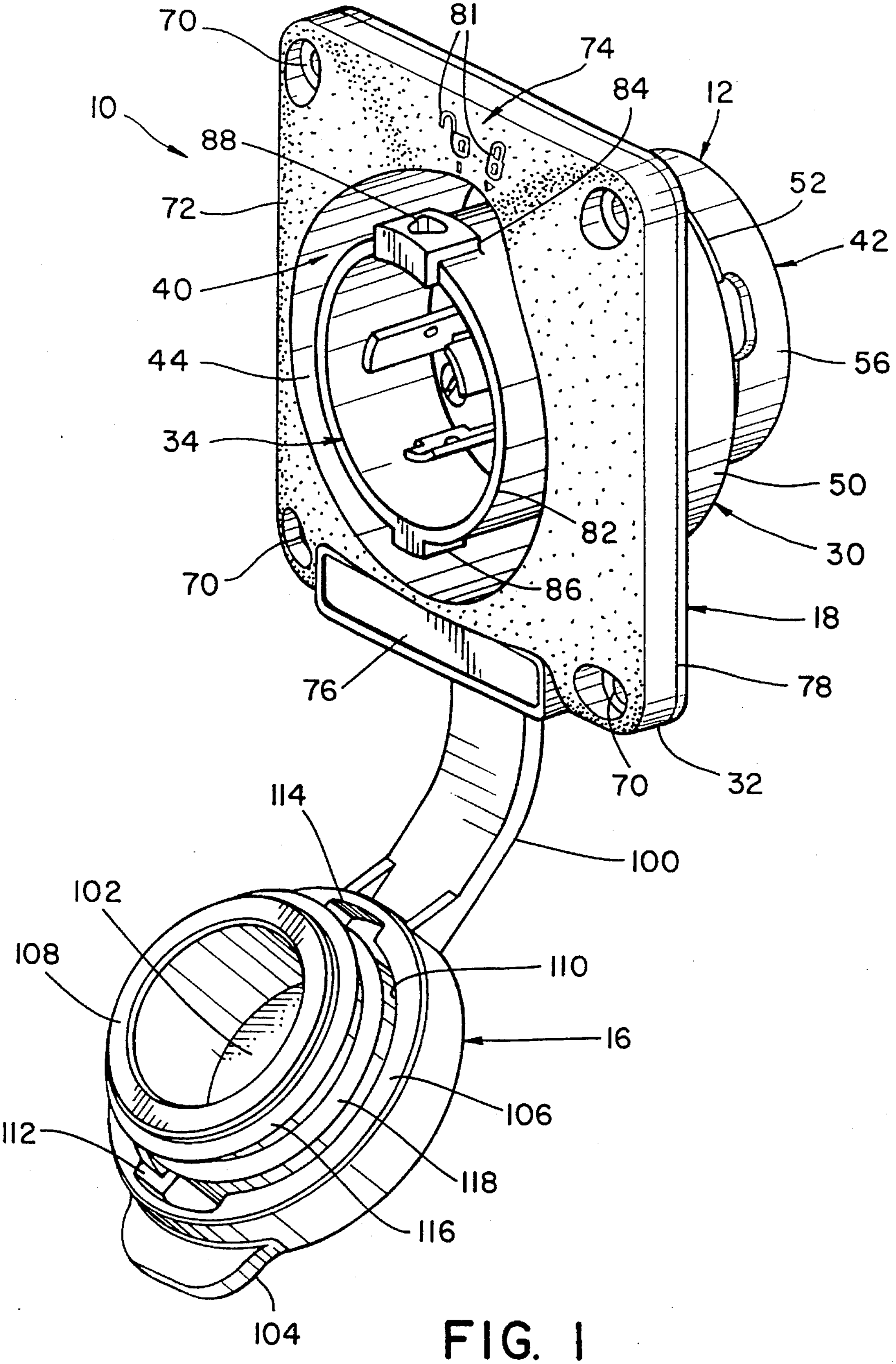
FIG. 1 is a perspective view of an electrical connector assembly in the form of inlet or male electrical connector which is adapted to be coupled to an electrical enclosure (not shown) and having an electrical connector housing and a closure cap with integral gasket in accordance with the present invention.

Referring initially to FIGS. 1–6, an electrical connector assembly 10 in accordance with the present invention is illustrated, and includes an electrical connector housing 12 with an electrical connector 14 mounted therein, and a closure cap 16 with an integrally formed mounting gasket 18. While electrical connector assembly 10 is illustrated in the form of an inlet with male electrical connector 14 coupled thereto, it will be apparent to those skilled in the art that the present invention can be utilized with a receptacle or female electrical connector.

Electrical connector 14 is a conventional electrical connector which is well known in the art. Thus, electrical connector 14 will not be described or illustrated in detail herein.

Figure 5:
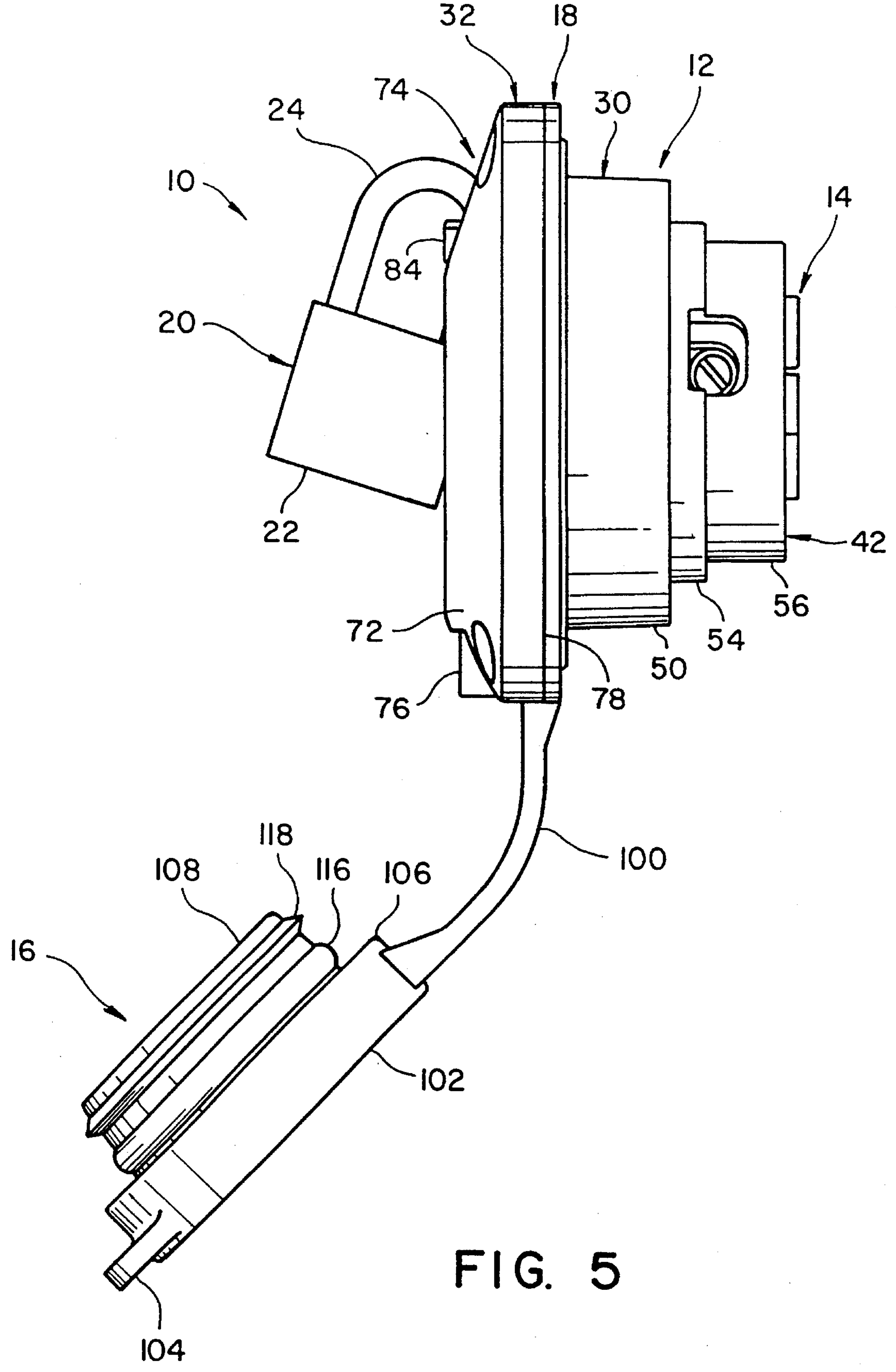
FIG. 5 is a right side elevational view of the electrical connector assembly illustrated in FIGS. 1–4, with a padlock coupled thereto.
Figure 6:
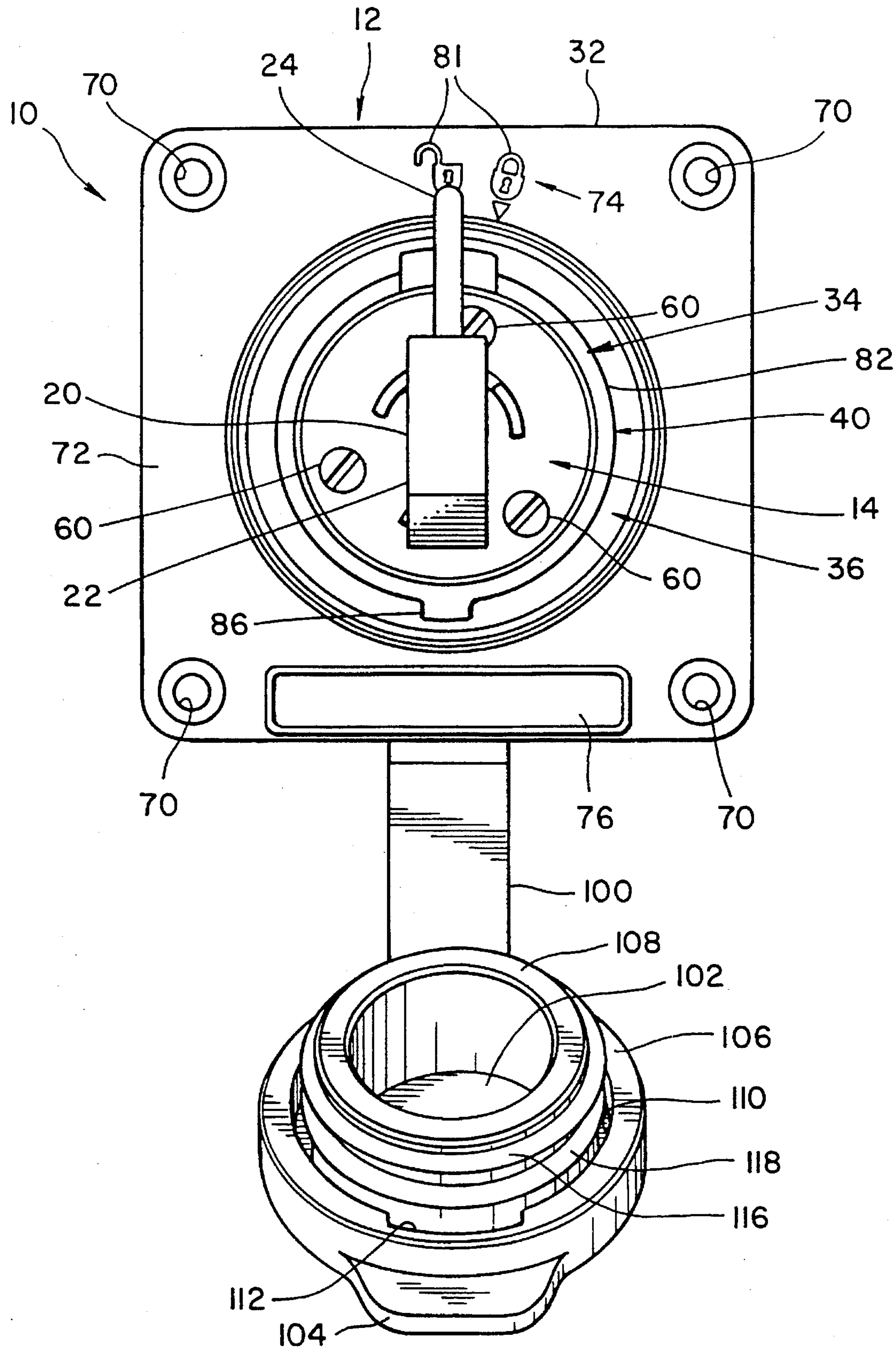
FIG. 6 is a front elevational view of the electrical connector assembly illustrated in FIGS. 1–5, with a padlock coupled thereto.
Figure 8:
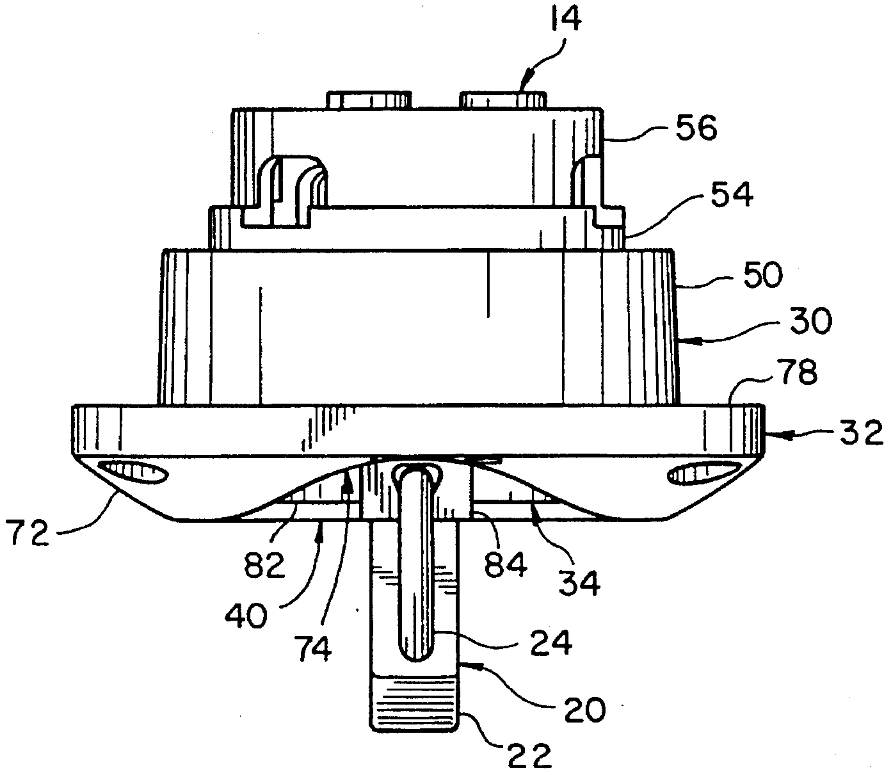
FIG. 8 is a top plan view of the electrical connector housing illustrated in FIG. 7, with a padlock coupled thereto.

As seen in FIGS. 5, 6 and 8, electrical connector housing 12 is specially designed for receiving a locking member or mechanism such as padlock 20 or the like. Accordingly, electrical connector assembly 10 together with padlock 20 provides a security lockout mechanism to prevent unauthorized use of electrical connector 14.

Preferably, the locking mechanism is a conventional padlock 20 having a body 22 and a shackle 24. The shackle 24 of the padlock 20 extends through a part of electrical connector housing 12 as discussed below so that padlock 20 is positioned in front of the axial face of the body of electrical connector 14. In this manner, padlock 20 prevents a mating electrical connector (not shown) from being connected to electrical connector 14.

Closure cap 16 with its integral mounting gasket 18 are especially designed to provide the dual function of (1) sealing electrical connector housing 12 to a wiring enclosure (not shown) and (2) sealing electrical connector 14 from the weather. Since closure cap 16 and mounting gasket 18 are integrally formed, closure cap 16 will hang from electrical connector housing 12 even when not in use. Accordingly, closure cap 16 will always be attached to electrical connector housing 12 even when not in use. This ensures that closure cap 16 will always be readily available to the user for sealing the electrical connector contacts of electrical connector 14 whenever necessary.

Turning now to electrical connector housing 12, as best seen in FIGS. 3–10, electrical connector housing 12 is preferably an insulated housing having a tubular body portion 30, a mounting flange portion 32, a tubular shroud 34 and a shroud seal 36. Preferably, tubular body portion 30, mounting flange portion 32 and shroud 34 of electrical connector housing 12 are all constructed of insulating material such as a plastic. For example, tubular body portion 30, mounting flange portion 32 and shroud 34 can be constructed of a polyester blend such as GE's Valvox 3570.

Tubular body portion 30 and mounting flange portion 32 are preferably integrally molded as a one piece, unitary member by a straight draw mold process. Thus, tubular body portion 30 and mounting flange portion 32 do not have any hidden surfaces which require the use of sliders or the like during molding thereof. Tubular body portion 30 has a first open end 40 for receiving electrical connector 14 therein, a second open end 42 for receiving electrical wires (not shown)' therethrough for electrically connecting with the contacts of electrical connector 14, and a tubular inner surface 44. for receiving electrical connector and shroud 34 therein.

Figure 3:
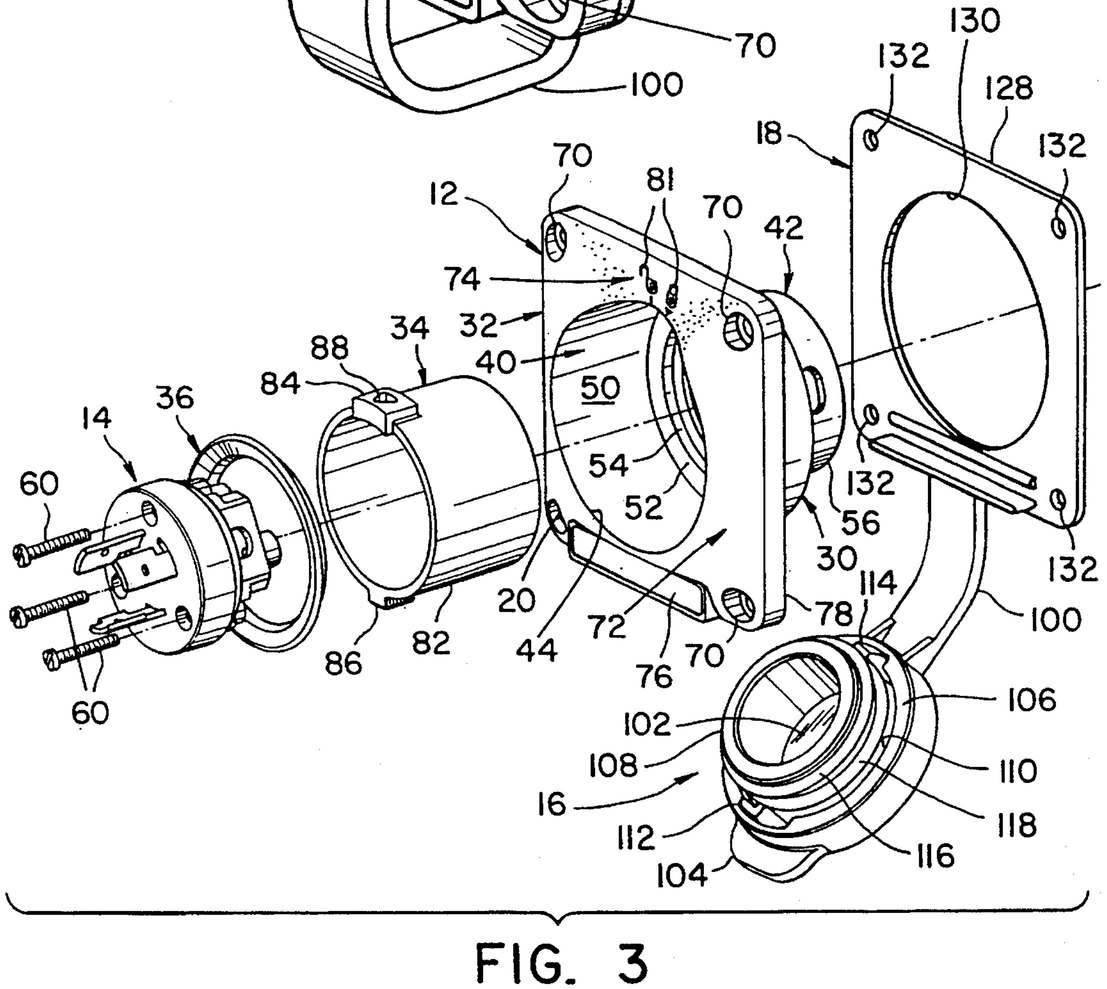
FIG. 3 is an exploded perspective view of the electrical connector assembly illustrated in FIGS. 1 and 2 in the form of an inlet or male electrical connector.
Figure 4:
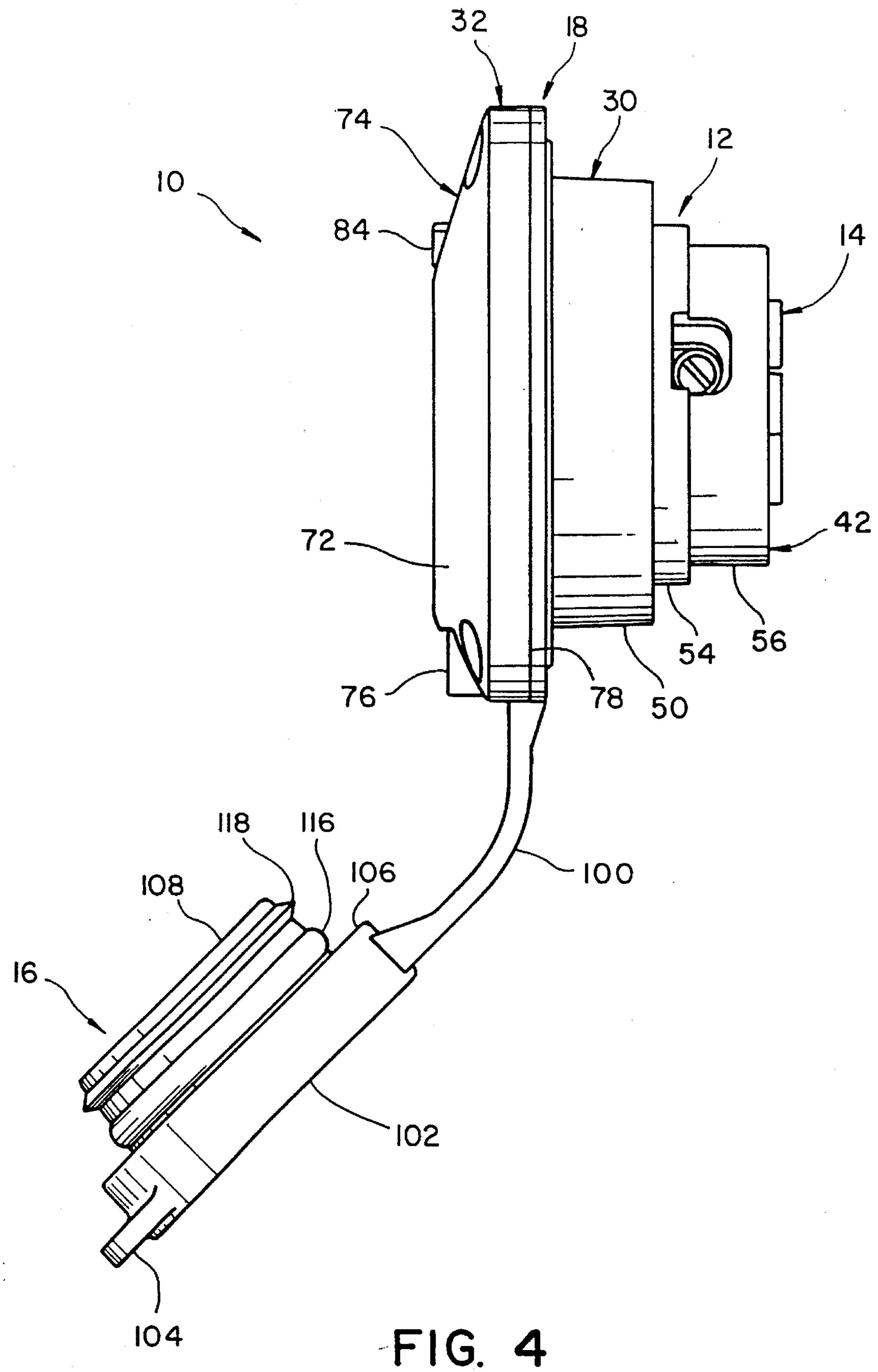
FIG. 4 is a right side elevational view of the electrical connector assembly illustrated in FIGS. 1–3.
Figure 7:
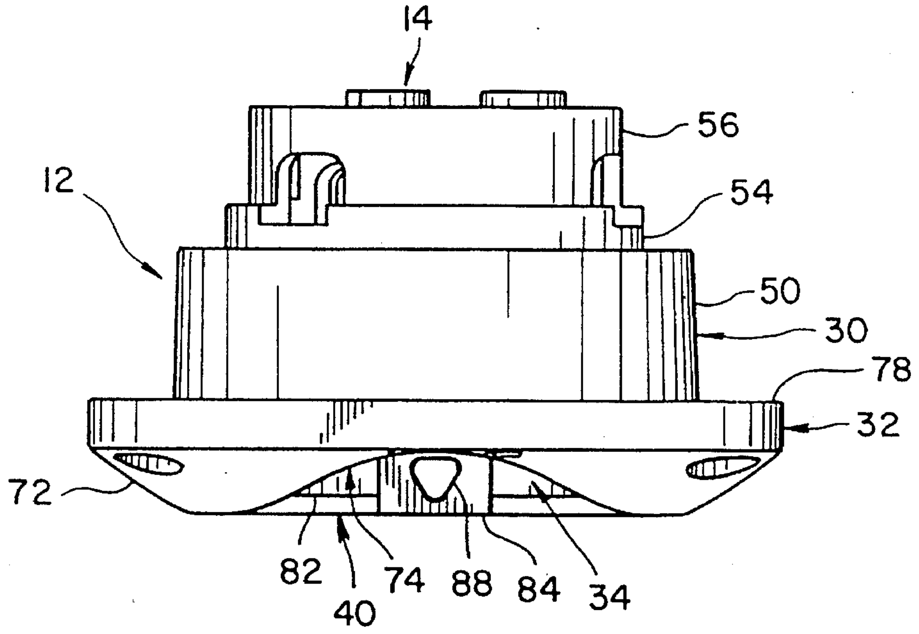
FIG. 7 is a top plan view of the electrical connector assembly illustrated in FIG. 6, with the closure cap removed for clarity.
Figure 10:
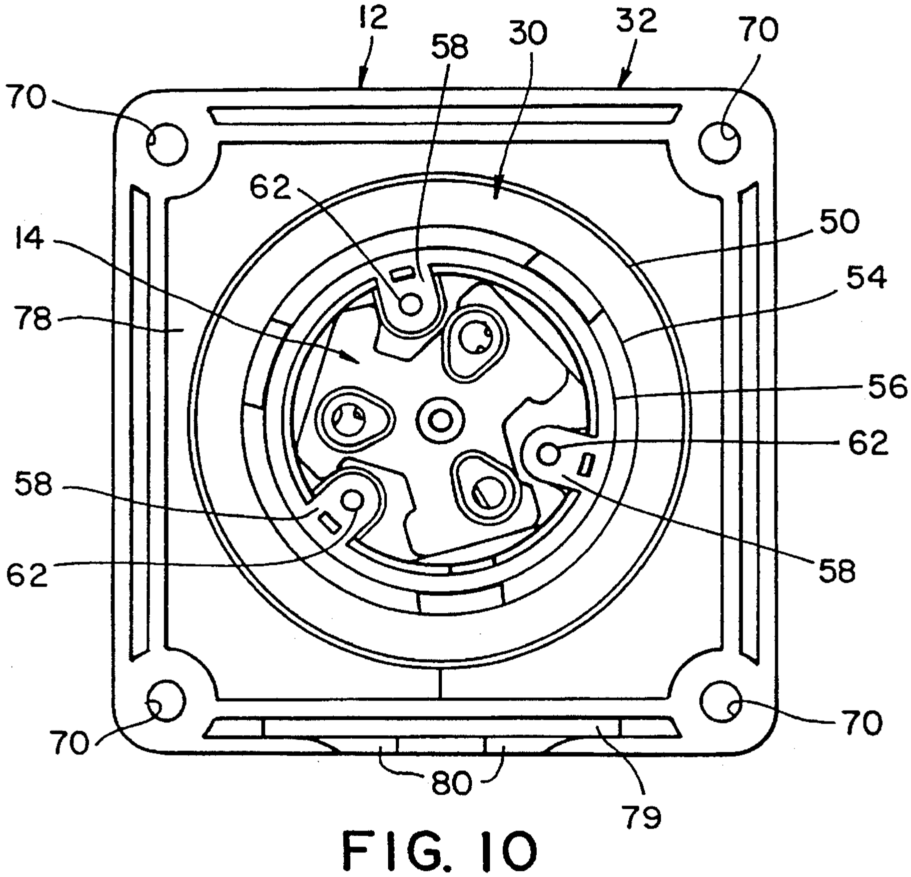
FIG. 10 is a rear elevational view of the electrical connector housing illustrated in FIGS. 1–4 with the closure cap removed for clarity.
Figure 11:
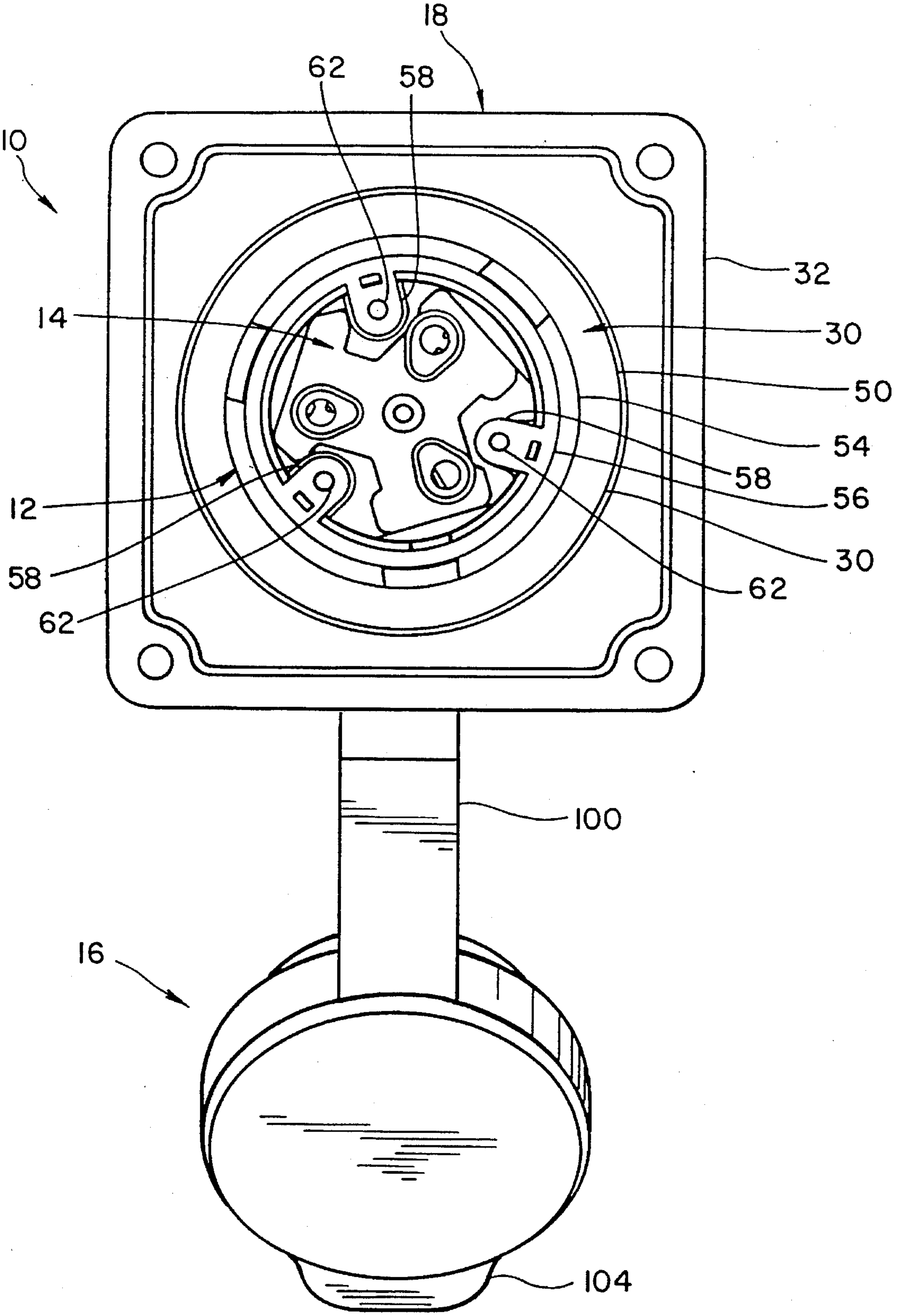
FIG. 11 is a rear elevational view of the electrical connector housing illustrated in FIG. 10 with the closure cap assembled thereto.
Figure 12:
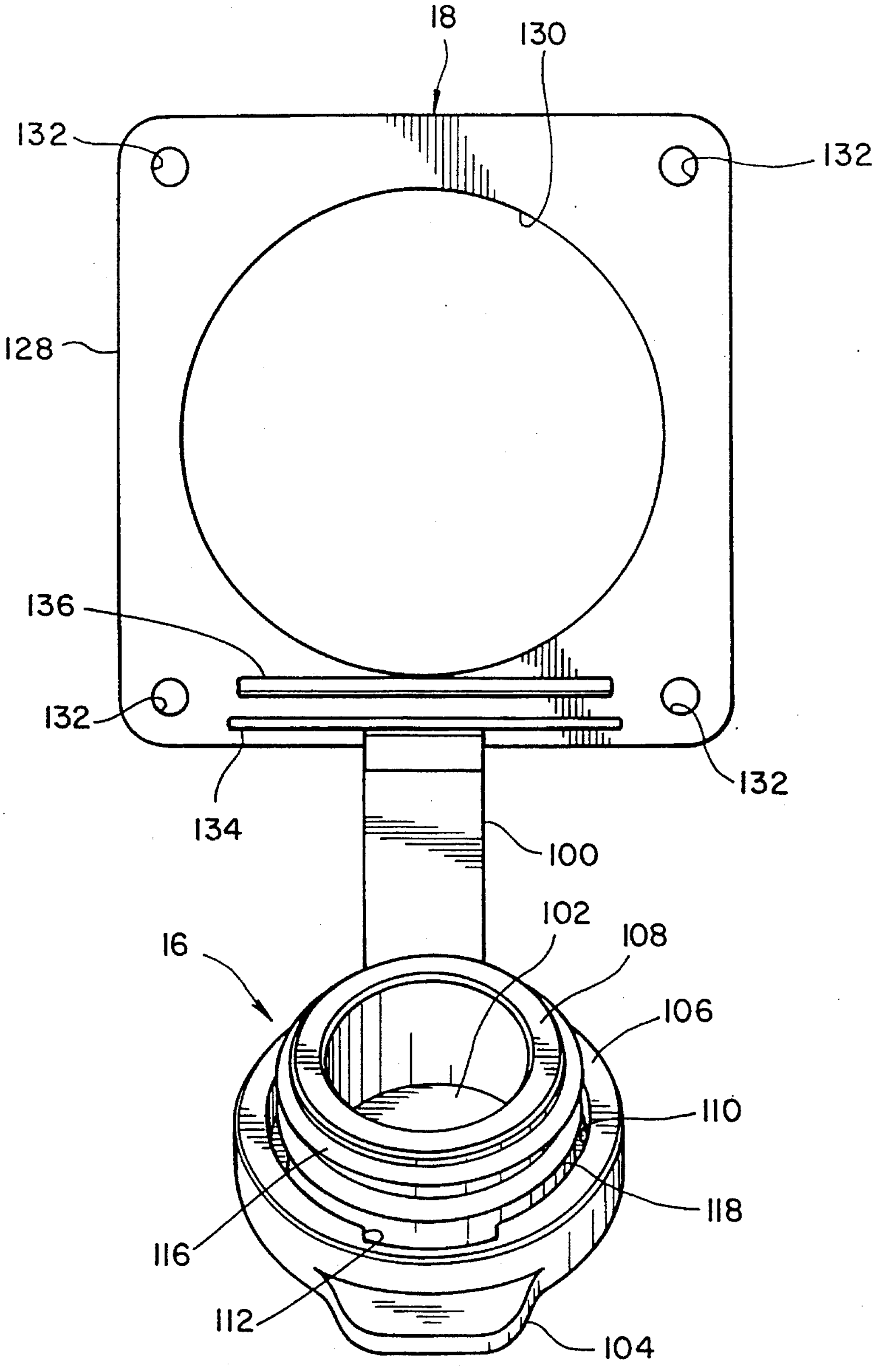
FIG. 12 is a front elevational view of the closure cap with integral gasket in accordance with the present invention for use with the electrical connector housing of the present invention.
Figure 13:
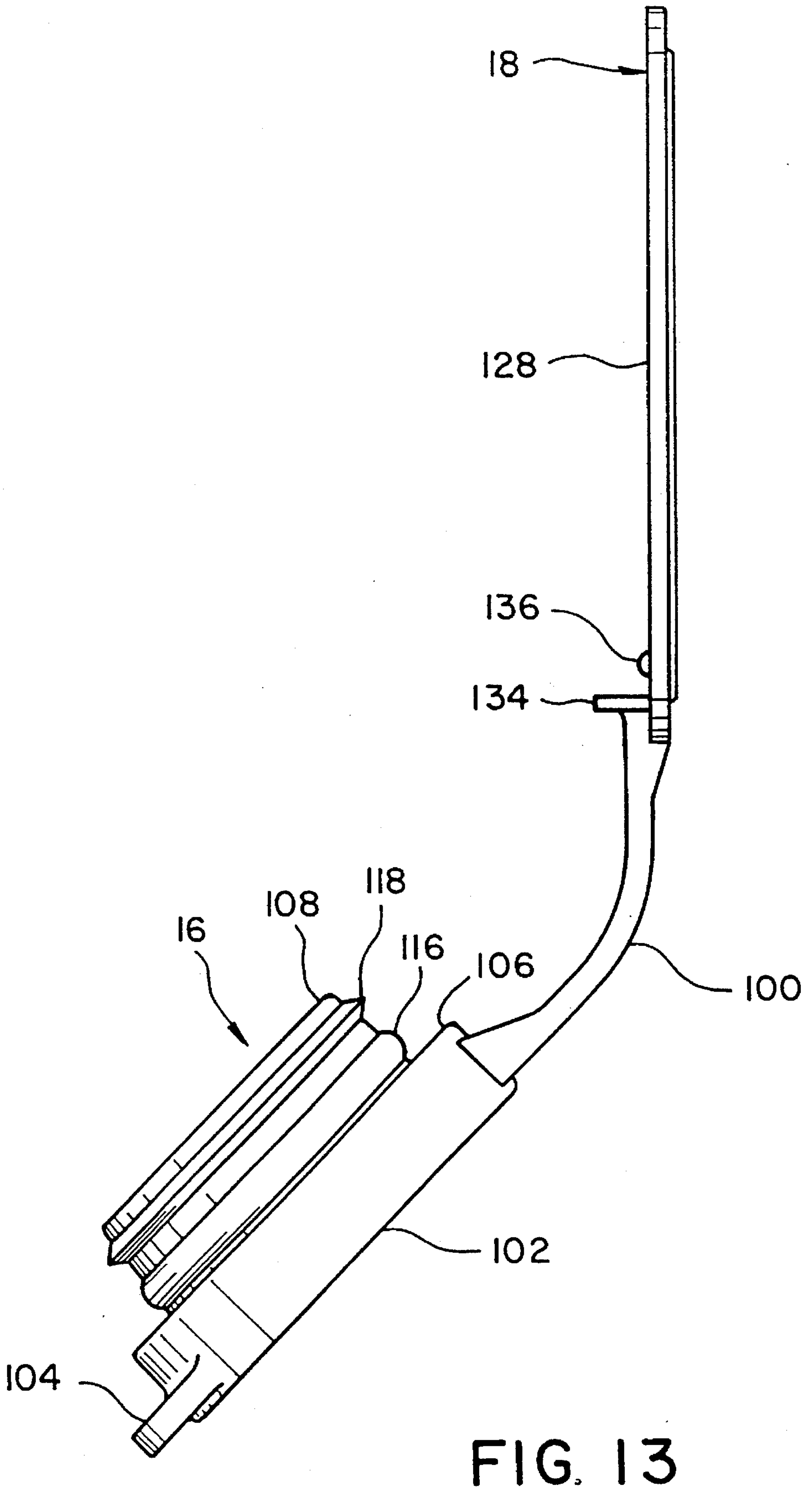
FIG. 13 is a side elevational view of the closure cap with integral gasket in accordance with the present invention for use with the electrical connector housing of the present invention.

More specifically as seen in FIGS. 3, 7 and 10, tubular body portion 30 includes a first cylindrical section 50 adjacent first open end 40, an annular sealing surface 52 extending radially inwardly from the inner end of first cylindrical surface 50, a second cylindrical section 54 extending from annular sealing surface 52, a third cylindrical section 56 extending concentrically from second cylindrical section 54 to second end 42, and a set of mounting lugs 58 located at the inner surface of third cylindrical surface 56.

As seen in FIGS. 3, 6, 10 and 11, electrical connector 12 is fixedly secured within tubular body portion 30 via screws 60, which are threadedly received within holes 62 of mounting lugs 58. Shroud 34 is press fit into second cylindrical section 54 and against third cylindrical section 56 so that shroud 34 is concentrically arranged within first cylindrical section 50 to form an annular cylindrical recess between first cylindrical section 50 and shroud 34 for receiving a shroud of a mating electrical connector therein. The interface between shroud 34 and second cylindrical section 52 can be provided with a sealant or an adhesive as needed and/or desired.

Figure 2:
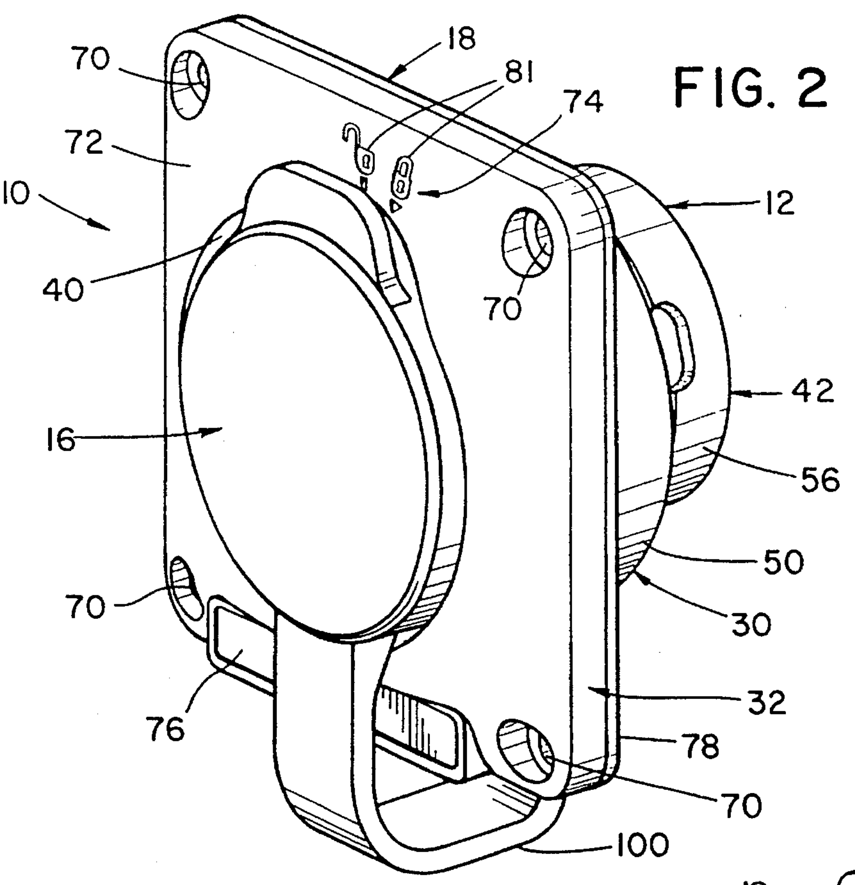
FIG. 2 is a perspective view of the electrical connector assembly illustrated in FIG. 1 with the closure cap covering the electrical contacts of the electrical connector.

Shroud seal 36 is mounted on shroud 34 within the annular recess of housing 12 and engages annular sealing surface 52. More specifically, when a mating shrouded electrical connector is installed into the annular recess of electrical connector housing 12, the shroud of the mating electrical connector will engage shroud seal 36 and compress shroud seal 36 against annular sealing surface 52 to create a weathertight seal therebetween when electrical connector 14 is connected to a mating electrical connector. The preferred embodiment of shroud seal 36 is disclosed in U.S. patent Ser. No. 08/442,839 entitled "Shroud Seal for Shrouded Electrical Connector", the disclosure of which is hereby incorporated herein by reference, As seen in FIGS. 1, 2 and 6, mounting flange portion 32 extends radially outwardly from tubular body portion 30 at first open end 40, and has a generally rectangular outer configuration. Mounting flange portion 32 has four mounting holes 70 for receiving screws or other suitable fasteners to couple electrical connector housing 12 to an electrical enclosure (not shown). The exterior or front surface 72 of mounting flange portion 32 is sculptured to provide a substantially smooth and attractive appearance.

As best seen in FIGS. 7 and 8, exterior surface 72 has a notched section 74 at its upper end such that padlock 20 can be attached to shroud 34 as discussed below. Exterior surface 72 also has a rectangular label section 76 for mounting various pertinent information about electrical connector 14. Notched section 74 is a curved notch having its curvature lying on an imaginary cylinder extending substantially perpendicular to an imaginary cylinder extending outwardly from first cylindrical section 50. Preferably, the imaginary cylinders of notched section 74 and first cylindrical section 50 are substantially the same diameter.

When electrical connector 14 is a rotatable locking type connector, exterior surface 72 of mounting flange portion 32 is also provided with indicia 81 which indicates a locked and unlocked position. Of course, indicia 81 would not be utilized for a pin type electrical connector which does not rotate.

Figure 9:
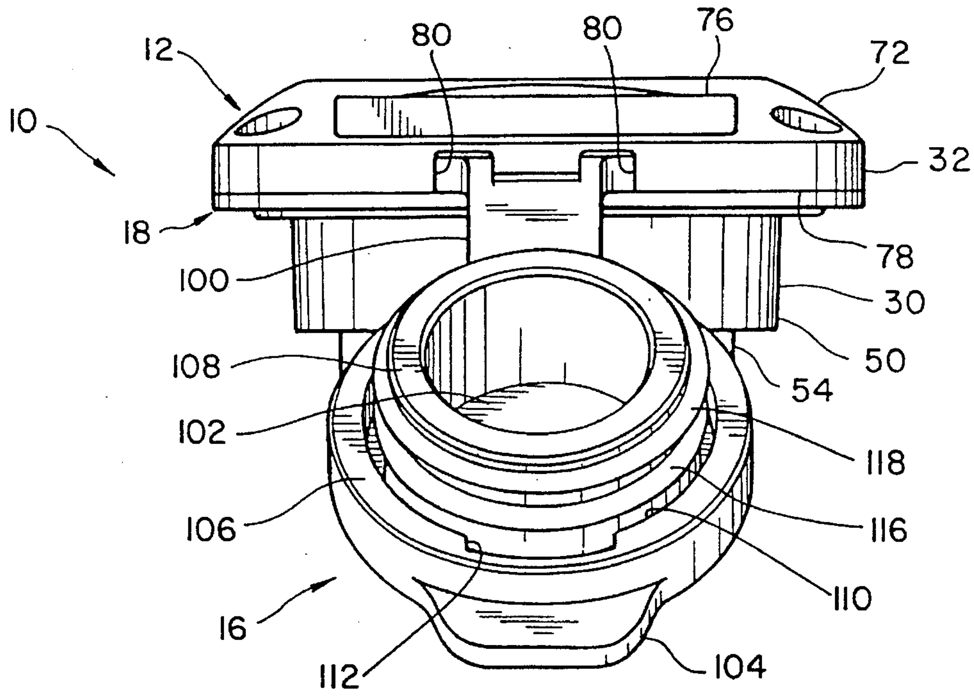
FIG. 9 is a bottom plan view of the electrical connector assembly illustrated in FIGS. 1–4.

As seen in FIG. 10, mounting flange portion 32 has an interior surface 78 for engaging gasket 18. When electrical connector housing 12 is mounted on an enclosure, gasket 18 will be squeezed between interior surface 78 of mounting flange portion 38 and the exterior surface of the enclosure. Interior surface 78 has a retaining slot 79 located at its lower edge for accommodating part of gasket 18 therein to prevent gasket 18 from being pulled out by a user grabbing closure cap 16. As seen in FIG. 9, a pair of notches 80 are also formed in the bottom wall of mounting flange portion 32 for accommodating a part of cap closure 16 as discussed below.

As best seen in FIGS. 1, 3 and 6–8, shroud 34 has a substantially cylindrical sleeve 82 with a pair of polarizing members 84 and 86 formed at one end of sleeve 82. Polarizing members 84 and 86 are preferably spaced 180° apart. Of course, if a non-polarizing electrical connector is utilized, polarizing members 84 and 86 can be eliminated. Moreover, if desired, only one polarizing member could be utilized or many polarizing members can be utilized on cylindrical sleeve 82 as needed and desired.

As mentioned above, shroud 34 is press fitted into second cylindrical section 54 of tubular body portion 50 so that it is rigidly coupled thereto. Polarizing member 84 includes a triangular shaped lockout hole 88 which is adapted to receive padlock 20 therethrough. When shroud 34 is press fitted into second cylindrical section 54 of tubular body portion 30, lockout hole 88 is aligned with notched section 74 as seen in FIGS. 1, 7 and 8. Accordingly, notched section 74 of the exterior surface of mounting flange portion 32 provides sufficient clearance for padlock 20 to be installed through lockout hole 88.

This arrangement allows the free end of shroud 34 with its polarizing members 84 and 86 to be substantially recessed from the outermost edge of exterior surface 72 of mounting flange 32 where it intersects with first cylindrical section 50 of tubular body portion 30. Since shroud 34 of electrical connector 14 does not extend outwardly from flange portion 32 of electrical housing 12, flange portion 32 protects shroud 34 so that it cannot be accidentally hit and broken by a glancing blow of a bypasser.

Although padlock 20 is illustrated, other restricted access mechanisms can be used. For example, the locking member or mechanism may be a threaded bolt threadedly connected to sleeve 82 such that the bolt sinks radially into sleeve 82 to interfere with coupling of electrical connector 14 with a mating electrical connector. Alternatively, the locking mechanism may be a rigid or flexible shaft having a coupling device or clasp to connect the end of the shanks such as, for example, a lead security wire.

Thus, the embodiment of the present invention depicted in the drawings provides an economic and efficient lockout member or mechanism for locking electrical connector 14. Moreover, the locking member or shackle 24 can be easily removed and does not interfere with the operation of the electrical connector 14 after padlock 20 is removed. By providing padlock 20 as shown, unauthorized use of the electrical connector 14 is prevented and the potential risk of injury to an operator is avoided.

CLOSURE CAP WITH INTEGRAL MOUNTING GASKET

Referring now to FIGS. 1–3 and 11–13, closure cap 16 and integrally mounted gasket 18 forms a sealing arrangement which is designed to seal electrical connector 14 within electrical connector housing 12, and to seal electrical connector housing 12 to a wiring enclosure (not shown). Since closure cap 16 is integrally formed with mounting gasket 18, closure cap 16 will be readily accessible to the user even when closure cap 16 is not being used. Closure cap 16 and mounting gasket 18 are integrally formed as a one piece, unitary member out of a suitable sealing material such as an elastomeric material or rubber. For example, one suitable material would be EPDM/neoprene.

Closure cap 16 is connected to mounting gasket 18 via a flexible strap 100. Closure cap 16 has an outer substantially circular end wall 102, a release tab 104, a first cylindrical wall 106 and a second cylindrical wall 108. First and second cylindrical walls 106 and 108 extend substantially perpendicular to outer end wall 102 with second cylindrical wall 108 being concentrically arranged within first cylindrical wall 106. Accordingly, first cylindrical wall 106 and second cylindrical wall together with outer end wall 102 forms an annular groove 110 which is adapted to receive the free end of shroud 34 therein.

Groove 110 is sized to frictionally receive the free end of shroud 34 such that cap 16 is frictionally retained on shroud 34. More specifically, first cylindrical wall 106 has a pair of cutouts 112 and 114 for accommodating polarizing members 84 and 86 of shroud 34. Preferably, the inner diameter of first wall 106 and the inner surface of cutouts 112 and 114 are designed to be substantially the same size as the outer surfaces of shroud 34 and polarizing members 84 and 86, respectively, so as to provide a seal therebetween.

Strap 100 and tab 104 are connected to the outer surface of first wall 106 with strap 100 and tab 104 being spaced approximately 180° apart. When closure cap 16 is installed on shroud 34 to cover electrical connector 14, tab 104 is positioned across from notched section 74 of mounting flange portion 32 such that the user can easily grab tab 104. In particular, the user can insert a finger between tab 104 and the curved surface of notched section 74 to pull closure cap 16 off of shroud 34.

Second wall 108 is a substantially cylindrical member with first and second annular ribs 116 and 118 for engaging the interior surface of shroud 34. More specifically, ribs 116 and 118 are sized to be slightly larger than the interior diameter of shroud 34 so as to provide a proper seal therebetween. This interface between rib 116 and shroud 34 is the primary seal for protecting electrical connector 14 from water and/or other contaminants. Rib 116 preferably has a triangular cross-section which extends outwardly from second wall 108 for sealing of cap 16 with the inner surface of shroud 34. Rib 118, on the other hand, has a semi-circular cross-section which extends outwardly from second wall 108.

When closure cap 16 is properly installed on shroud 34, ribs 116 and 118 engage the inner surface of shroud 34 to provide a seal therebetween, and the free edge of shroud 34 engages the interior surface of outer end wall 102.

Referring to FIGS. 3 and 11–13, mounting gasket 18 is preferably substantially rectangular in shape or substantially corresponds to the outer shape of mounting flange portion 32. Mounting gasket 18 has a rectangular body portion 128 with a large center opening 130 for receiving tubular body portion 30 therethrough. Mounting gasket 18 also has four holes 132 for receiving the mounting fasteners (not shown) which are used to couple electrical connector assembly 10 to an enclosure (not shown).

Gasket 18 also preferably has a first flange 134 extending outwardly and substantially perpendicular to body portion 128 along its bottom edge at its connection with strap 100 for engaging a recess or retaining slot 79 formed in the back side or interior surface 78 of mounting flange portion 32. Gasket 18 further includes a second flange 136 extending outwardly and substantially perpendicular to body portion 128 of gasket 18. Flange 136 is substantially parallel to flange 134 and is received in a recess of the interior surface 78 of mounting flange portion 32. Flanges 134 and 136 cooperate with mounting flange portion 32 to prevent gasket 18 from being pulled out from between mounting flange portion 32 and the enclosure (not shown) by closure cap 16.

When electrical connector assembly 10 is fixedly coupled to an enclosure (not shown), mounting gasket 18 is sandwiched between the enclosure (not shown) and the mounting flange portion 32. Accordingly, mounting gasket 18 securely fastens closure cap 16 to the enclosure (not shown) so that closure cap 16 is readily accessible.

Preferably, strap 100 is designed to break at its connection point with mounting gasket 18. Accordingly, should someone pull on the closure cap too hard, the closure cap will tear off without destroying the mounting gasket 18.

Accordingly, this arrangement ensures that closure cap 16 is always accessible for covering electrical connector 14 and cannot be easily detached. Moreover, this arrangement keeps closure cap 16 out of the way when a mating electrical connector is coupled to electrical connector 14.

INSTALLATION AND OPERATION

Electrical connector assembly 10 is assembled by press fitting shroud 34 into second cylindrical section 54 of tubular body portion 30 so as to fixedly couple shroud 34 to tubular body portion 30. A sealing material and/or an adhesive may also be utilized for sealing and/or coupling the interface between shroud 34 and second cylindrical section 54 of tubular body portion 30.

Next, electrical connector 14 and shroud seal 36 are installed into tubular body portion 30. Specifically, electrical connector 14 is coupled via screws 60 which are threaded into holes 62 of lugs 58. Shroud seal 36 is installed on shroud 34 by stretching it by polarizing members 84 and 86 and onto the outer surface of shroud 34. Shroud seal 36 is pushed all the way back along shroud 34 until it engages annular sealing surface 52 of tubular body portion 30. In this position, shroud seal 36 can readily engage the shroud of a mating electrical connector.

Now, electrical connector housing 12 together with closure cap 16 and mounting gasket 18 can be coupled to an electrical enclosure. More specifically, tubular body portion 30 of electrical connector housing 12 is inserted into opening 130 of gasket 18 such that holes 132 are aligned with holes 70 of mounting flange portion 32 and flange 134 is received within retaining slot 79 formed in the back or interior surface 78 of mounting flange portion 32. In this position, closure cap 16 hangs downwardly from the bottom of electrical connector housing 12.

Now, the mounting screws (not shown) are inserted through holes 70 of mounting flange portion 32 and holes 132 of gasket 18 to fixedly secure electrical connector assembly 10 to an enclosure (not shown). Once electrical connector assembly 10 is fixedly secured to the enclosure (not shown), gasket 18 is sandwiched or squeezed between the mounting flange portion 32 of electrical connector housing 12 and the outer surface of the enclosure (not shown) with closure cap 16 hanging down therefrom.

While only one embodiment has been chosen to illustrate the present invention, it will be understood by those skilled in the art that various changes and modifications can be made herein without departing from the scope of the invention as defined in the appended claims.

What is claimed is:

1. An electrical connector housing for an electrical enclosure, comprising:

a tubular body portion having a first open end and a second open end with an inner surface extending therebetween, said tubular body portion being adapted to house a set of electrical contacts and receive a mating electrical connector therein;

a flange portion extending outwardly from said tubular body portion at said first open end, said flange portion having an interior surface and an exterior surface with a notched section intersecting with said tubular body portion; and a tubular shroud concentrically coupled within said tubular body portion, said tubular shroud having a first end positioned adjacent said first open end of said tubular body portion and a second end coupled to said tubular body portion, said first end of said tubular shroud having a lockout hole formed therein being sized to receive a locking mechanism therein, said first end of said tubular shroud having said lockout hole located adjacent said notched section of said outer surface for receiving a locking mechanism therein.

2. An electrical connector housing according to claim 1, wherein said flange portion has mounting holes for receiving mounting fasteners therein.

3. An electrical connector housing according to claim 1, wherein said notched section is a curved surface formed by said inner surface of said tubular body portion intersecting with said outer surface of said flange portion.

4. An electrical connector housing according to claim 3, wherein said curved surface lies on an arc of a cylindrical plane extending perpendicular to said tubular body portion.

5. An electrical connector housing according to claim 1, wherein said tubular body portion is provided with mounting lugs for mounting a contact retainer housing therein.

6. An electrical connector housing according to claim 1, wherein said tubular shroud is recessed within said tubular body portion except at said notched section.

7. An electrical connector housing according to claim 1, wherein said shroud includes at least one polarizing member.

8. An electrical connector housing according to claim 7, wherein said at least one polarizing member has said lockout hole formed therein.

9. An electrical connector housing according to claim 1, wherein said flange portion includes a gasket retaining slot.

10. An electrical connector housing according to claim 1, wherein said exterior surface of said flange portion has a sloping front surface intersecting with said tubular body portion which taper away from said tubular body portion towards said interior surface except along said notched section.

11. An electrical connector housing according to claim 10, wherein said flange portion further includes a label section extending outwardly from its exterior surface of said flange portion.

12. An electrical connector housing according to claim 1, wherein said notched section has indicia thereon for indicating a locked position and an unlocked position.

13. An electrical connector housing according to claim 6, wherein said shroud includes at least one polarizing member.

14. An electrical connector housing according to claim 13, wherein said at least one polarizing member has said lockout hole formed therein.

15. An electrical connector housing according to claim 14, wherein said tubular body portion is provided with mounting lugs for mounting a contact retainer housing therein.

16. An electrical connector housing according to claim 15, wherein said flange portion has mounting holes for receiving mounting fasteners therein.

17. An electrical connector housing according to claim 15, wherein said notched section has indicia thereon for indicating a locked position and an unlocked position.

18. An electrical connector housing according to claim 15, wherein said notched section is a curved surface formed by said inner surface of said tubular body portion intersecting with said outer surface of said flange portion.

19. An electrical connector housing according to claim 18, wherein said exterior surface of said flange portion has a sloping front surface intersecting with said tubular body portion which taper away from said tubular body portion towards said interior surface except along said notched section.

20. An electrical connector housing according to claim 19, wherein said lockout hole is a triangular shaped hole, and said notched section has indicia thereon for indicating a locked position and an unlocked position.

* * * * *